(12) United States Patent
Week et al.

(10) Patent No.: US 9,805,048 B2
(45) Date of Patent: Oct. 31, 2017

(54) SYSTEM AND METHOD FOR MANAGING A DEDUPLICATION TABLE

(71) Applicant: Oracle International Corporation, Redwood City, CA (US)

(72) Inventors: Lisa Week, Golden, CO (US); Mark Maybee, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 112 days.

(21) Appl. No.: 13/655,035

(22) Filed: Oct. 18, 2012

(65) Prior Publication Data

US 2014/0115258 A1    Apr. 24, 2014

(51) Int. Cl.
*G06F 12/00* (2006.01)
*G06F 17/30* (2006.01)
*G06F 12/123* (2016.01)
*G06F 12/127* (2016.01)

(52) U.S. Cl.
CPC ...... *G06F 17/30159* (2013.01); *G06F 12/123* (2013.01); *G06F 12/127* (2013.01)

(58) Field of Classification Search
CPC ...... G06F 12/12; G06F 12/121; G06F 12/122; G06F 12/123; G06F 12/1018
See application file for complete search history.

(56) References Cited

U.S. PATENT DOCUMENTS

| | | | | |
|---|---|---|---|---|
| 6,044,478 A | * | 3/2000 | Green | G06F 12/0815 711/141 |
| 6,421,761 B1 | * | 7/2002 | Arimilli | G06F 12/0848 711/128 |
| 7,814,149 B1 | * | 10/2010 | Stringham | 709/203 |
| 7,921,086 B1 | * | 4/2011 | Bromley | G06F 17/30067 707/692 |
| 8,392,384 B1 | * | 3/2013 | Wu | G06F 17/30156 707/693 |
| 8,463,742 B1 | * | 6/2013 | Floyd | G06F 17/30303 707/609 |
| 2003/0149843 A1 | * | 8/2003 | Jarvis | G06F 12/123 711/133 |
| 2008/0005141 A1 | * | 1/2008 | Zheng | G06F 3/0608 |

(Continued)

OTHER PUBLICATIONS

D. Kay, M. Maybee, Aspects of Deduplication, SNIA 2010.*

(Continued)

*Primary Examiner* — David X Yi
*Assistant Examiner* — Francisco Grullon
(74) *Attorney, Agent, or Firm* — Polsinelli PC (57) ABSTRACT

Implementations described and claimed herein provide systems and methods for allocating and managing resources for a deduplication table. In one implementation, an upper limit to an amount of memory allocated to a deduplication table is established. The deduplication table has one or more checksum entries, and each checksum entry is associates a checksum with unique data. A new checksum entry corresponding to new unique data is prevented from being added to the deduplication table where adding the new checksum entry will cause the deduplication table to exceed a size limit. The new unique data has a checksum that is different from the checksums in the one or more checksum entries in the deduplication table.

18 Claims, 6 Drawing Sheets

(56) References Cited

U.S. PATENT DOCUMENTS

| | | | |
|---|---|---|---|
| 2008/0086598 A1* | 4/2008 | Maron | G06F 12/126 711/133 |
| 2008/0086599 A1* | 4/2008 | Maron | G06F 12/126 711/133 |
| 2008/0201331 A1* | 8/2008 | Eriksen et al. | 707/10 |
| 2010/0250858 A1* | 9/2010 | Cremelie et al. | 711/136 |
| 2011/0238634 A1* | 9/2011 | Kobara | 707/692 |
| 2012/0030477 A1* | 2/2012 | Lu | G06F 11/1453 713/189 |

OTHER PUBLICATIONS

J. Bonwick, ZFS Deduplication, Jeff Bonwick's Blog Nov. 1, 2009.*

J. Wright, Sun ZFS Storage Appliance Deduplication Design and Implementation Guidelines, Oracle, Mar. 2011.*

\* cited by examiner

SYSTEM AND METHOD FOR MANAGING A DEDUPLICATION TABLE

TECHNICAL FIELD

Aspects of the present disclosure relate to data storage systems, and in particular, systems and methods for allocating and managing resources for a deduplication table and for assigning priorities to data stored in a cache.

BACKGROUND

As the demand for data storage continues to increase, larger and more sophisticated storage systems are being designed and deployed. Many large scale data storage systems utilize storage appliances that include arrays of storage media. Multiple storage appliances may be networked together to form a cluster, which allows for an increase in the volume of stored data. The increase in the number of components, the number of users, and the volume of data often results in disparate users creating separate but identical copies of data, leading to exponential growth in physical storage capacity. For example, multiple members of a business may use the same operating system or store the same document. In such cases, data deduplication technologies can significantly increase data storage efficiency and reduce cost. Data deduplication technologies remove redundancy from stored data by storing unique data a single time and subsequent, redundant copies of that data as indices in a deduplication table pointing to the unique data. As a result, data can be stored in a fraction of the physical space that would otherwise be required. For example, 100 copies of a 10 gigabyte (GB) operating system can be stored with 10 GB of physical capacity, and 1000 copies of the same 1 megabyte (MB) file can be stored with 1 MB of physical capacity.

Memory caching is widely used in data storage systems. Reading from and writing to cache memory is significantly faster than accessing other storage media, such as accessing spinning media. Data deduplication involves performing a lookup into the deduplication table prior to writing data to determine if the data is a duplicate of existing data. As such, to perform deduplication efficiently and not impact system response time, many data storage systems store the deduplication table in cache memory, such as a direct random access memory (DRAM) based cache. However, cache memory remains significantly more expensive than other storage media. Consequently, cache memory is usually only a fraction of the size of other storage media in a data storage system.

In some cases, a deduplication table can grow unbounded, beyond the size of the available memory cache. While this allows for the deduplication of arbitrary amounts of data storage, portions of the deduplication table may be evicted from the memory cache as the size of the deduplication table grows. Specifically, if cache memory is full, existing data must be evicted from the cache memory before new data may be stored. Many caching systems and methods evict data based on algorithms that track recency (evicting data that has been least recently used), frequency (evicting data that has been least frequently used), or some combination of recency and frequency. However, such algorithms fail to identify the importance of data, resulting in important data that is not recently or frequently used, such as all or portions of the deduplication table, being evicted from the memory cache into other storage media, such as flash or spinning disks. When all or a portion of the deduplication table is stored in flash or disks, read and write request overhead is substantially increased, resulting in significantly reduced system performance.

It is with these observations in mind, among others, that various aspects of the present disclosure were conceived and developed.

SUMMARY

Implementations described and claimed herein address the foregoing problems by providing systems and methods for allocating and managing resources for a deduplication table. In one implementation, an upper limit to an amount of memory allocated to a deduplication table is established. The deduplication table has one or more secure hash entries, and each secure hash entry associates a secure hash value with unique data. A new secure hash entry corresponding to new unique data is prevented from being added to the deduplication table where adding the new secure hash entry will cause the deduplication table to exceed the upper limit. The new unique data has a secure hash value that is different from the secure hash values in the one or more secure hash entries in the deduplication table.

Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

DETAILED DESCRIPTION

Aspects of the present disclosure involve systems and methodologies to increase efficiency of access to important data, such as a deduplication table, by keeping such data resident in cache memory. In one aspect, an administrator has the option to allocate and manage cache memory for the deduplication table. In other words, the administrator sets the amount of cache memory designated to the deduplication table, putting an upper limit on the size of the deduplication table. If writing a new entry in the deduplication table will cause the size of the deduplication table to exceed the upper limit, deduplication of new unique blocks is turned off or otherwise prohibited. Specifically, new unique data will be stored, but an entry corresponding to the new unique data will not be created in the deduplication table. Accordingly, the size of the deduplication table is capped, ensuring that it will be resident in cache memory.

In another aspect, important data, such as the deduplication table, is kept resident in cache memory. A priority state, such as critical, high, and normal, is assigned to cached data. The priority state dictates how long the data is cached and consequently, the order in which the data is evicted from the cache memory. Data assigned a priority state of critical will be resident in cache memory unless heavy memory pressure causes the system to reclaim memory and all data assigned a priority state of high or normal has been evicted. High priority data is cached longer than normal priority data, with normal priority data being evicted first. Accordingly, important data assigned a priority state of critical, such as the deduplication table, is kept resident in cache memory at the expense of other data, regardless of the frequency or recency of use of the data.

Figure 1:
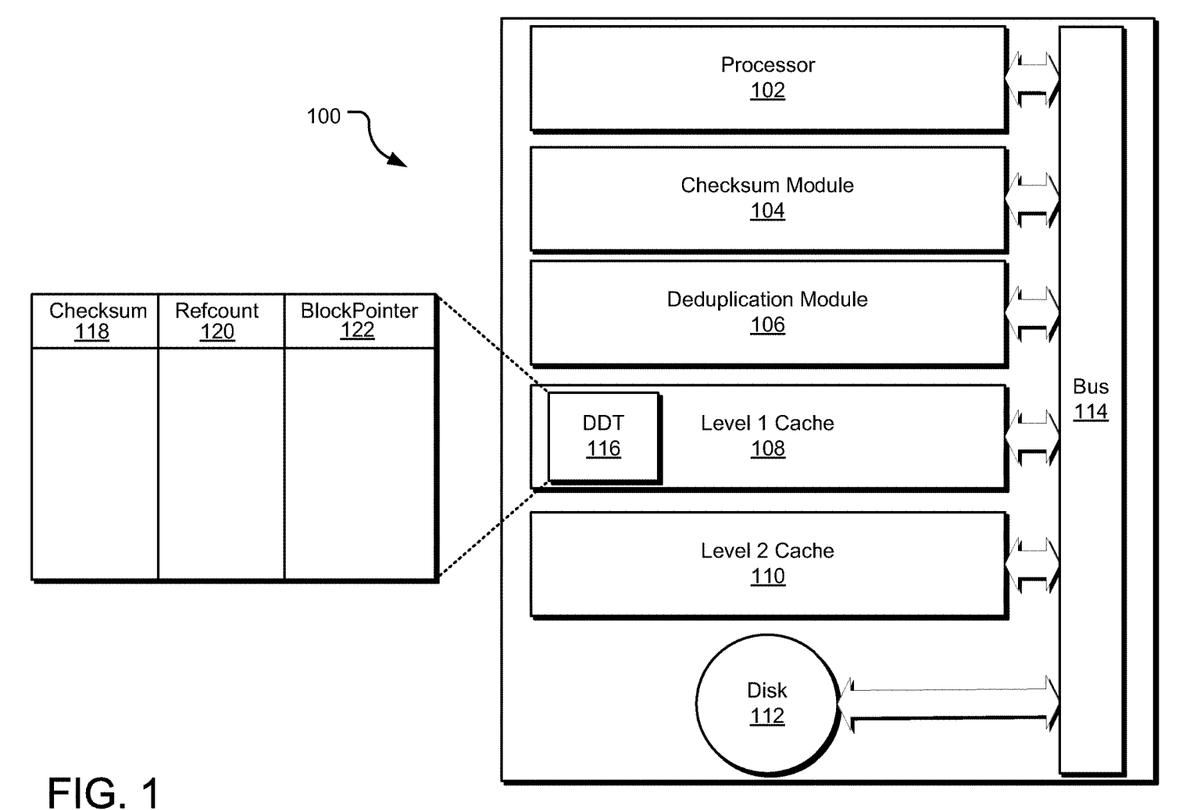
FIG. 1 is an example file system incorporating a deduplication table stored in cache memory.

FIG. 1 is an example file system 100 incorporating a deduplication table stored in cache memory. An implementation of the file system 100 comprises a processor 102, a checksum module 104, a deduplication module 106, a level 1 cache 108, a level 2 cache 110, and a disk 112 in communication via a bus 114.

The file system 100 caches data in a hierarchy to optimize performance while reducing monetary cost. The level 1 cache 108 may correspond to any tangible storage medium that stores data, and may be a volatile storage media such as direct random access memory ("DRAM"). Certain data, such as frequently-accessed or recently-accessed data, that speeds up the operation of the processor 102 during read/write operations is stored in the level 1 cache 108. In one implementation, the level 1 cache 108 uses a variant of the Adaptive Replacement Cache ("ARC") algorithm, as described with respect to FIG. 3. Data allowing for slower access, such as data less frequently or recently used, is stored in the level 2 cache 110 or the disk 112. The level 2 cache 110 and the disk 112 may be persistent non-volatile storage, with the level 2 cache 110 comprising faster memory and/or storage devices relative to the disk 112. In one implementation, the level 2 cache 110 comprises flash memory based solid state disks and the disk 112 comprises hard disk drives. The level 2 cache 110 may be, for example, L2ARC.

The processor 102 issues a write request via the bus 114 to write data to one or more of the level 1 cache 108, the level 2 cache 110, and the disk 112. The checksum module 104 and the deduplication module 106 intercept the data from the write request to perform deduplication operations to eliminate the storage of duplicate copies of data. Deduplication may be implemented at various granularity levels, including file, block, and byte levels. File level deduplication removes redundancy between files but cannot remove redundancy within a specific file. Block-level deduplication removes redundancy both within a file and between files. For example, most of a virtual machine image file is duplicated data (e.g., a guest operating system) with some blocks of data being unique to each virtual machine. By implementing a block-level deduplication, only blocks of data that are unique to each virtual machine image consume additional storage space and all other duplicate blocks of data are shared. Byte-level duplication, which is the finest granularity, removes duplicate bytes. While file-level deduplication initially has the lowest overhead, if there is any change to a block of data in a file, deduplication operations must be performed again. In other words, if one block of data in a file changes, the two copies of the file are no longer identical. Accordingly, file-level deduplication is not suited for use if the file system 100 manages files, such as virtual machine images, that are substantially identical with a few blocks of data differing. On the other hand, byte-level deduplication is costly because the file system 100 determines where regions of duplicated versus unique data begin and end. Block level deduplication provides a general deduplication with less overhead than byte-level deduplication. As such, in a particular implementation, the file system 100 performs block-level deduplication. However, other levels of granularity are contemplated.

In one implementation, deduplication is synchronous (i.e., real time or in-line). Specifically, duplicate data is removed as it appears during a write request from the processor 102. The checksum module 104 computes a checksum for a block of data using a hash function that uniquely identifies the block of data with a significantly high level of probability. In one implementation, the checksum module 104 uses a secure hash, such as a 256-bit block checksum function that is cryptographically strong (e.g. SHA256). A secure hash has such a substantially small likelihood of producing the same output given two different inputs that if two blocks of data have the same checksum, there is a substantially high probability that the two blocks of data are the same block. In some implementations, a user may perform a verification to compare each block of data with duplicate blocks to confirm that the blocks are identical. Furthermore, the checksum module 104 may use a weaker hash function in combination with verification operations during deduplication.

A deduplication table 116 tracks unique blocks of data by mapping the checksum associated with the block of data to its storage location and reference count. In other words, the deduplication module 106 compares the checksum computed by the checksum module 104 to checksum entries 118 in the deduplication table 116. If the checksum matches one of the checksum entries 118, the block of data is a duplicate of existing data. Rather than allocating additional storage space to the duplicate block, the deduplication module increments a reference count 120 of the existing data, which indicates whether the block of data is highly replicated. For example, if the reference count 120 for a block of data is zero, the block of data is not in use and may be deleted. On the other hand, if the reference count 120 for a block of data is a large number, the block of data is used by multiple users, applications, functions, etc. The write operation is concluded by returning a block pointer 122 referencing a location where the block of data is stored.

If the checksum generated by the checksum module 104 does not match any of the checksum entries 118, the block of data is new unique data. Consequently, the block of data is written to a storage location in the level 1 cache 108, the level 2 cache 110, or the disk 112. The deduplication module 106 creates an entry in the deduplication table 116 corresponding to the new unique data. The checksum of the block of data is added to the checksum entries 118 with a corresponding reference count 120 of one and a block pointer 122 mapping the checksum to the storage location of the block of data. The write operation is concluded by returning the block pointer 122 referencing the location where the block of data is stored.

As shown in FIG. 1, the deduplication table 116 is stored in the level 1 cache 108. This is because deduplication operations are executed faster if the deduplication table 116 is stored in DRAM, slower if stored in the level 2 cache 110, and slower still if stored in the disk 112. This is because, as discussed above, during deduplication operations, the deduplication module 106 first reads the entries in the deduplication table 116 to determine if the checksum is present in the checksum entries 118. If the deduplication table 116 is stored in the level 2 cache 108 or the disk 112, the time spent waiting for the deduplication module 106 to read the deduplication table 116 is lengthy. As a result, with the processor 102 issuing many write requests at any given time, system performance would be greatly reduced. Accordingly, to increase efficiency, the deduplication table 116 is stored entirely within the level 1 cache 108.

However, if no restrictions are placed on the ability to deduplicate data, the deduplication table 116 grows unbounded. This is because every unique block of data has an entry in the deduplication table 116. As discussed herein, additional capacity in the level 1 cache 108 is costly and consequently relatively limited. Moreover, if the deduplication table 116 consumes too much space in the level 1 cache 108, it reduces the amount of space available for other data.

The deduplication module 106 ensures that the entire deduplication table 116 is kept resident in the level 1 cache 108 by limiting the size of the deduplication table 116 such that it does not exceed an upper limit that the level 1 cache 108 is configured to support. In one implementation, a user is provided with an option to designate the amount of memory in the level 1 cache 108 allocated to the deduplication table 116. The allocation ensures that there is enough memory in the level 1 cache 108 to store the deduplication table 116, while setting an upper limit on the size of the deduplication table 116. The user will not be able to allocate less memory in the level 1 cache 108 than the size of the deduplication table 116 or more memory than the memory available in the level 1 cache 108.

If the processor 102 issues a write request for a new unique block of data and the deduplication module 106 determines that creating a new entry in the deduplication table 116 will cause the size of the deduplication table 116 to exceed the upper limit, the deduplication module 106 turns off the deduplication of new unique blocks. In other words, the write request will be completed, with the new unique block of data being stored, but an entry corresponding to the new unique data is not created in the deduplication table 116. However, if the processor 102 issues a write request for a duplicate block of data, the deduplication module 106 may still increment the reference count 120 associated with the checksum 118 for the block of data. Accordingly, the size of the deduplication table 116 is capped, ensuring that the deduplication table 116 will be stored entirely within the level 1 cache 108.

In one implementation, once the upper limit of the deduplication table 116 is reached or nearly reached, the deduplication module 106 removes entries in the deduplication table 116 to make space available for new entries. For example, if an entry has a reference count 120 of one (1) for a certain length of time, the deduplication module 106 may delete the entry. Evictions may proceed based on the reference count 120 alone or in conjunction with other information, such as time in the level 1 cache 108. If the processor 102 issues a write request for a block data corresponding to the checksum of the deleted entry, a new entry will be created in the deduplication table 116. As another example, the deduplication module 106 may delete entries in the deduplication table 116 based on user input.

Figure 2:
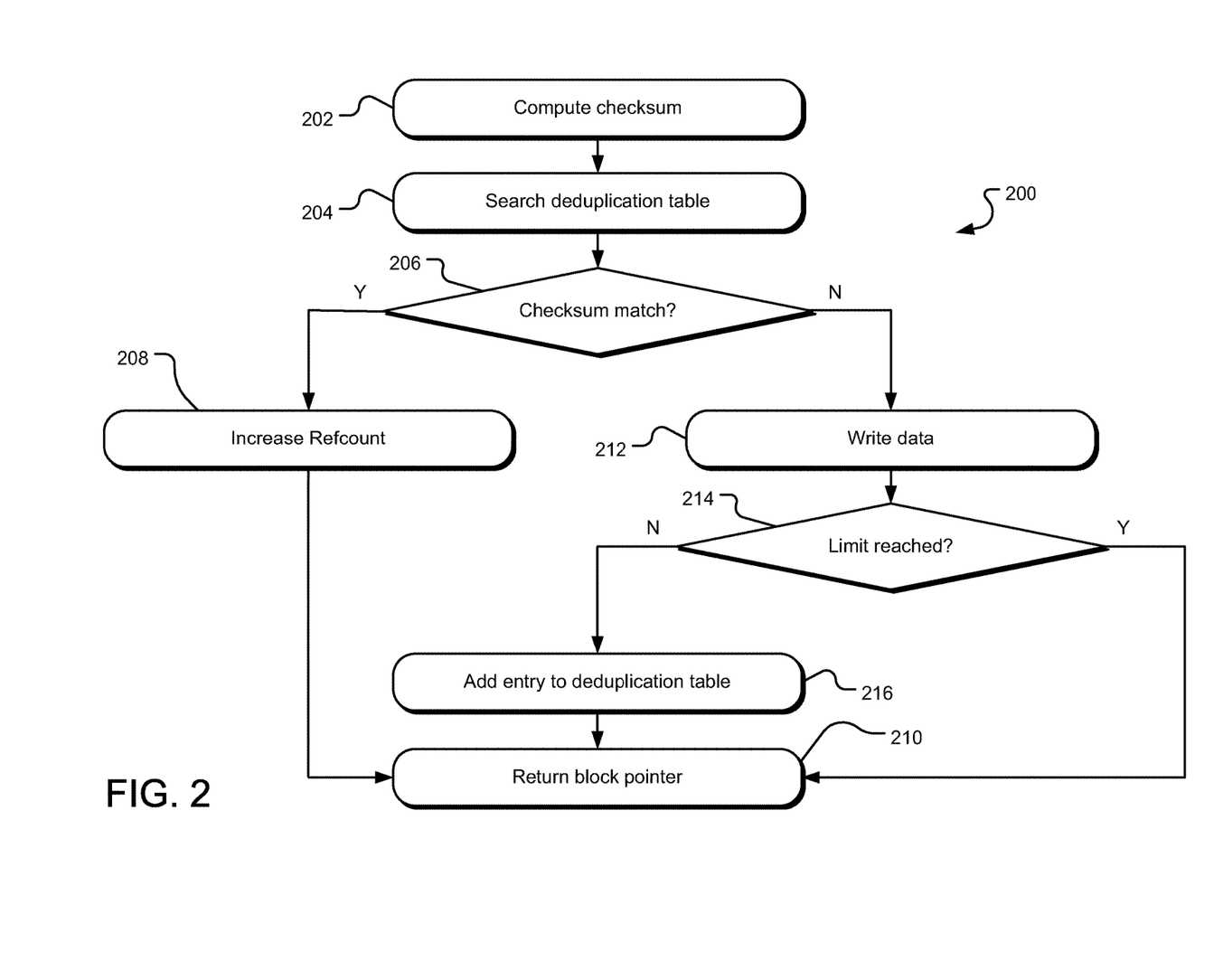
FIG. 2 is a flow chart illustrating example operations for allocating and managing resources for a deduplication table.

FIG. 2 is a flow chart illustrating example operations 200 for allocating and managing resources for a deduplication table. In one implementation, in response to a write request for a chunk of data (e.g., a file, a block, or a byte) a computing operation 202 computes a checksum for the data using a hash function that uniquely identifies the chunk of data with a significantly high level of probability. A searching operation 204 searches a deduplication table for the checksum. An operation 206 determines determine whether the checksum matches an entry in the deduplication table.

If the checksum computed at the computing operation 202 matches a checksum entry in the deduplication table, the chunk of data is a duplicate of existing data. Consequently, an incrementing operation 208 increments a reference count associated with the checksum entry in the deduplication table. A returning operation 210 concludes the write request by returning a pointer referencing a location where the existing data is stored.

If the checksum computed at the computing operation 202 does not match any of the checksum entries in the deduplication table, the chunk of data is new unique data. A writing operation 212 writes the data to a storage location. An operation 214 determines whether adding a new entry to the deduplication table will cause the size of the deduplication table to exceed an upper limit, which may be set, for example, by a user.

If adding a new entry to the deduplication table will not cause the size of the deduplication table to exceed the upper limit, an adding operation 216 will create a new entry in the deduplication table corresponding to the new unique data written during the writing operation 212. The returning operation 210 concludes the write request by returning a pointer referencing a location where the new unique data is stored.

If adding a new entry to the deduplication table will cause the size of the deduplication table to exceed the upper limit, deduplication of new unique blocks is turned off and a new entry is prevented from being added to the deduplication table. In other words, after the writing operation 212 writes the new unique data, the returning operation 210 concludes the write request by returning a pointer referencing the location where the new unique data is stored. A new entry corresponding to the new unique data is not created in the deduplication table.

Figure 3:
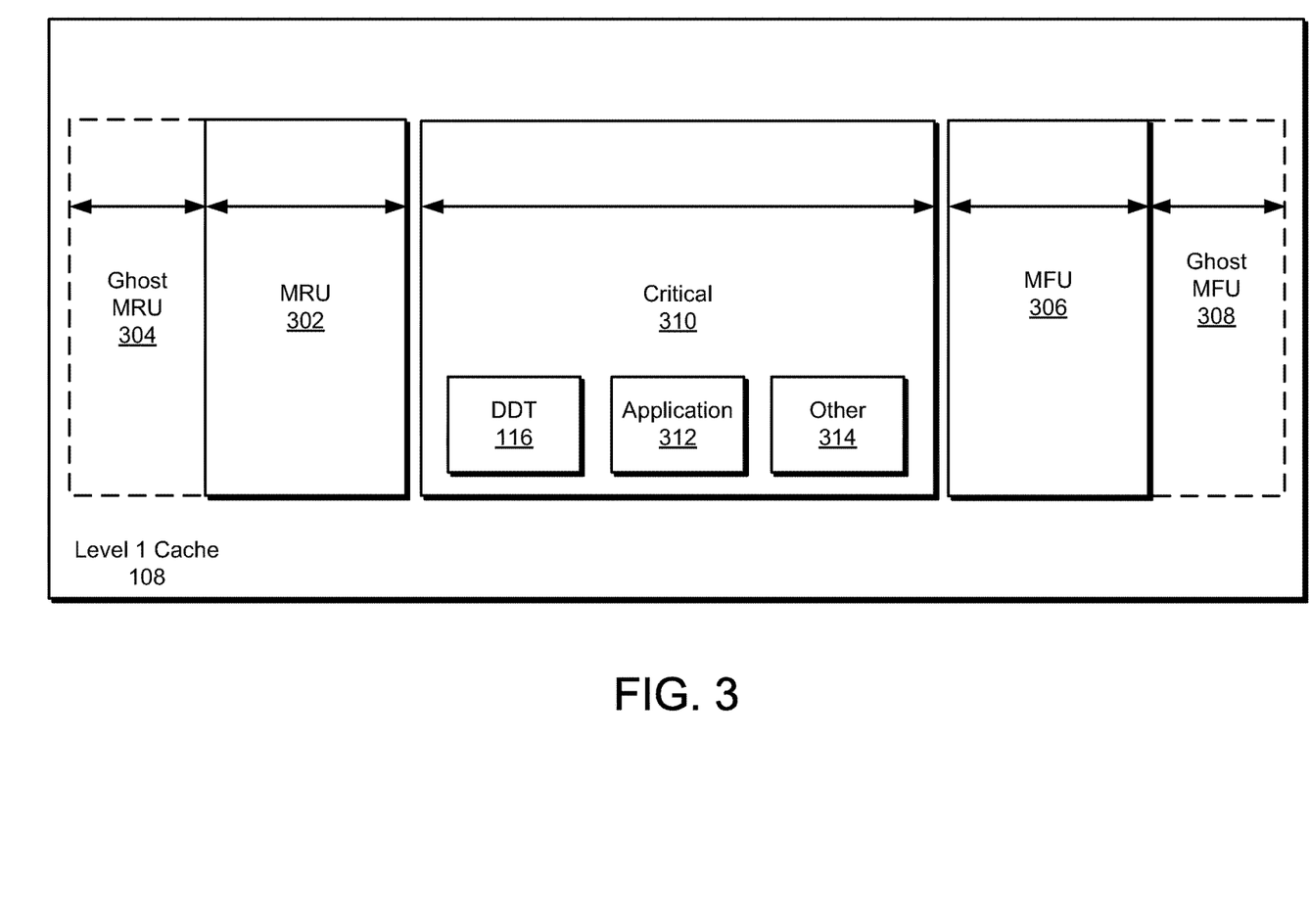
FIG. 3 is an example cache system storing data according to assigned priorities.

As shown in FIG. 3, in one implementation, the level 1 cache 108 uses a variant of the Adaptive Replacement Cache ("ARC") algorithm. The level 1 cache 108 maintains a cache directory split into a Most Recently Used ("MRU") list and a Most Frequently Used ("MFU") list. The MRU list is divided into two dynamic portions MRU 302 and ghost MRU 304, and the MFU list is divided into two dynamic portions MFU 306 and ghost MFU 308.

The MRU 302 and the MFU 306 are actual cache memory. The MRU 302 maintains a list of recently accessed cache entries, and the MFU 306 maintains a list of frequently accessed cache entries (i.e., entries that are referenced at least twice). The MRU 302 sorts the list based on the time of the most recent access, with new entries or cache hits at the top, pushing entries down until no free space exists in the level 1 cache 108 resulting in the bottom entry being evicted. Similarly, the MFU 306 sorts the list such that frequently accessed entries are at the top of the list, and entries that are accessed less frequently are near the bottom of the list and eventually evicted if no free space exists in the level 1 cache 108. In other words, the MRU 302 and the MFU 306 each have a target size that may be dynamically adjusted as well as a maximum size that is a percentage of the size of the level 1 cache 108. If the MRU 302 and MFU 306 are within these bounds, no evictions occur. If the MRU 302 reaches its target size and the MFU 306 has not reached its target size, the size of the MRU 302 may be increased at the expense of the MFU 306. Similarly, the size of the MFU 306 may be increased at the expense of the MRU 302. However, if the MRU 302 and MFU 306 reach the maximum size such that there is no free space in the level 1 cache 108, the bottom entry is evicted as new entries are added. Other ways of managing the size of each portion of the level 1 cache 108 and/or the eviction of data from the level 1 cache 108 or each portion of the level 1 cache 108 are also possible.

The ghost MRU 304 and the ghost MFU 308 each comprise a list tracking data recently evicted from the MRU 302 and the MFU 306, respectively. The ghost MRU 304 list and the ghost MFU 308 list only contain metadata (references for the evicted entries), not the cache entry itself.

The MRU 302 and the MFU 304 evict data based on recency and frequency of use. Consequently, important data that is not recently or frequently accessed may be evicted from the level 1 cache 108. For example, accesses across the deduplication table 116 tend to be random. As a result, portions of the deduplication table 116 may be evicted from the level 1 cache 108 into the level 2 cache 110 or the disk 112, which reduces efficiency of deduplication operations and overall system performance, as described herein.

To ensure that important data remains in the level 1 cache 108 as data is written to the level 1 cache 108, the important data is assigned a priority state indicating the relative importance of the data. The priority state dictates how long the data is stored in the level 1 cache 108, and consequently, the order in which the data is evicted from the level 1 cache 108.

In one implementation, data is assigned a priority of critical, high, or normal. Further, critical data is stored in a critical state 310 in the level 1 cache 108, high priority data is stored in the MFU 306, and normal data is stored in the MRU 302. Data is evicted from the level 1 cache 108 based on the priority state in conjunction with MRU or MFU processing. In one specific possible arrangement, the level 1 cache 108 evicts data from the MRU 302 first, and once all the data in the MRU 302 is evicted, the level 1 cache 108 evicts data from the MFU 306. In this scheme, data in the critical state 310 is stored in the level 1 cache 108 at the expense of the remaining data in the level 1 cache 108. Specifically, data in the critical state 310 is not evicted from the level 1 cache 108 unless heavy memory pressure causes the level 1 cache 108 to reclaim memory and all data in the MRU 302 and MFU 306 has been evicted. Accordingly, important data, assigned a priority state of critical is kept resident in the level 1 cache 108 at the expense of other data, regardless of the frequency or recency of use of the data.

Data assigned a normal priority level is stored in the MRU 302 and evicted in conjunction with MRU processing, and data assigned a high priority level is stored in the MFU 306 and evicted in conjunction with MFU processing. As discussed above, as recently accessed data is added to the MRU 302, the least recently accessed data is evicted if no free space exists in the level 1 cache 108. In one implementation, all data stored in the MRU 302 is assigned the normal priority level. Accordingly, data assigned the normal priority level is cached based on how recently the data was accessed. A new entry for data assigned the normal priority level is added to the top of the recently used list. The data moves down the recently used list unless a cache hit moves the data to back to the top of the recently used list. If no free space exists in the level 1 cache 108, the least recently used data is evicted from the MRU 302. For example, if the MFU 306 and/or the critical state 310 reach a size where additional space is needed, the MRU 302 evicts the least recently used data. Similarly, in one implementation, all data stored in the MFU 306 is assigned the high priority level and is cached based on how frequently the data was accessed. Data assigned the high priority data is not evicted from the MFU 306 until data stored in the MRU 302 is evicted, and if there is no free space after the data stored in the MRU 302 is evicted, the least frequently used data is evicted from the MFU 306. As detailed above, data assigned a critical priority level is evicted only after the data in the MRU 302 and the MFU 306 is evicted. In other implementations, the normal, high, and critical priority levels may each comprise sub-priority levels such that data is ranked in the MRU 302, the MFU 306, and the critical state 310 based on the sub-priority levels. In still other implementations, some data is not assigned a priority level and is cached as a lowest priority in the level 1 cache 108. Here, the lack of a priority infers a normal priority. Similarly, the lack of a priority may infer a critical priority and is treated in the manner described relative to critical priority data.

The priority level may be determined, for example, based on object type, user settings, or commands received from an application or system. In one implementation, the deduplication table 116 is assigned critical priority. Further, an application may issue a command to assign application data 312 a critical or other priority. Other data 314, including, but not limited to block allocation maps (data structures tracking storage locations of data blocks that are allocated or free) may be assigned a critical priority.

In one implementation, the critical state 310 cache is not pre-allocated space in the level 1 cache 108 memory. Instead, the critical state 310 cache consumes only as much space as needed until a maximum size is reached. The maximum size of the critical state 310 cache may be a substantial portion of the total level 1 cache 108, with enough remaining memory for the level 1 cache 108 to operate. Thus, as the critical state 310 cache portion grows, the MRU 302 and MFU 306 cache portions shrink, with the cache areas dynamically adjusting to the types of data using the cache. In one implementation, the maximum size of the critical state 310 is greater than the upper limit of the deduplication table 116, ensuring that the entire deduplication table 116 will be assigned a critical priority and stored in the level 1 cache 108.

If the maximum size of the critical state 310 is nearly the size of the level 1 cache 108 (e.g., $^{15}/_{16}$ of the level 1 cache 108) and the maximum size of the critical state 310 is reached such that critical data is being evicted, system performance may be significantly impacted. In such cases, feedback may be generated to warn the user about the potential for reduced system performance and suggest options for remedying the problem based on user preferences. For example, the user may add more memory to the level 1 cache 108, remove data, such as a storage pool (e.g., zpool), or restore a server that failed over into another storage pool causing the level 1 cache 108 to be temporarily oversubscribed.

Figure 4:
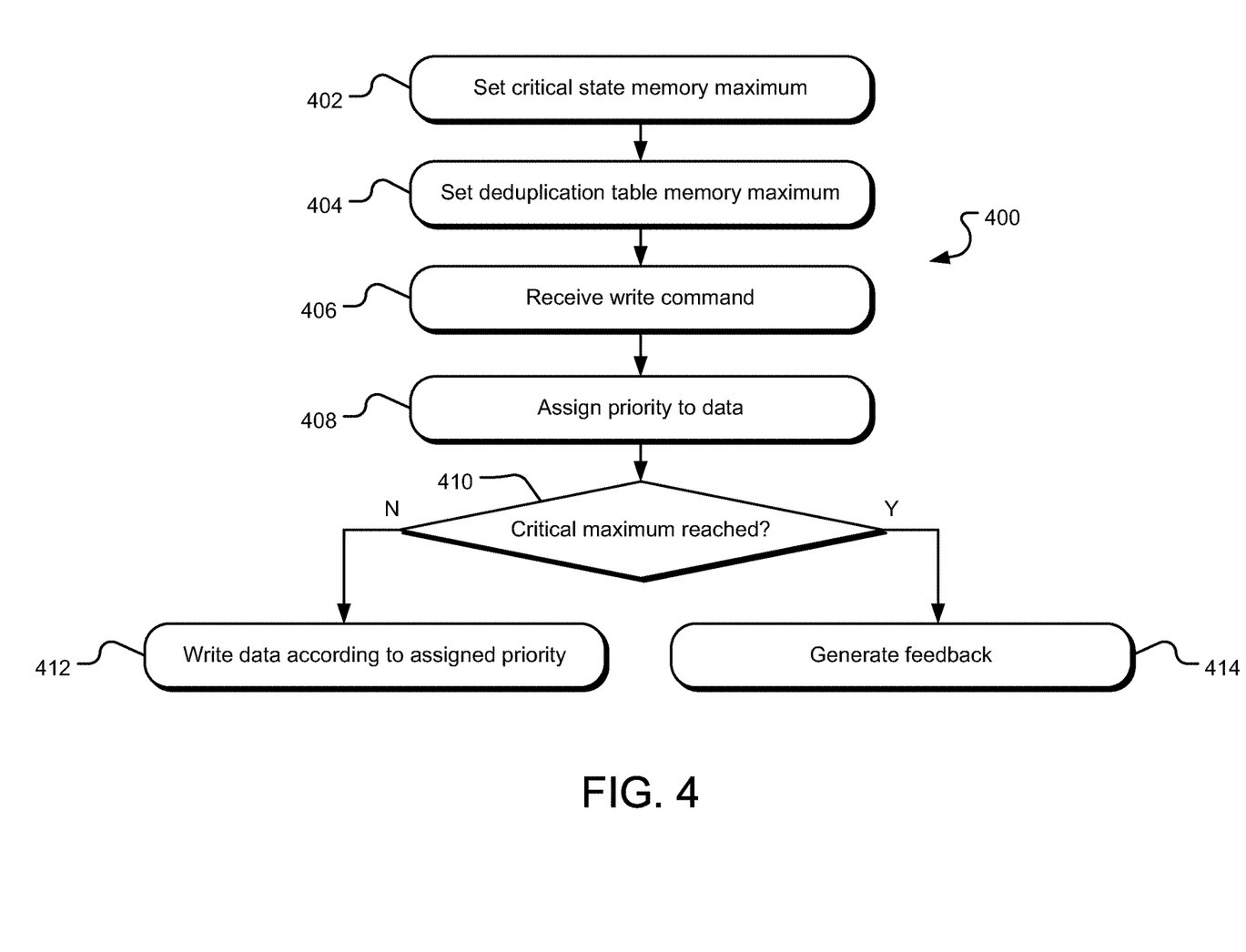
FIG. 4 is a flow chart illustrating example operations for assigning priorities to data stored in a cache.

FIG. 4 is a flow chart illustrating example operations 400 for assigning priorities to data stored in a cache. In one implementation, a setting operation 402 sets a maximum size of a critical state. Any data stored in the critical state is kept at the expense of any other data, regardless of the frequency or recency of use of the data stored in the critical state. Specifically, data in the critical state is cached longer and is not evicted unless all other data has already been evicted. In one implementation, the setting operation 402 sets the maximum size of the critical state at the time the file system is booted based on a value set forth in a system configuration file. The setting operation 402 may set the maximum size of the critical state at a substantial portion of the memory, leaving only enough remaining memory to carry out operations. Additionally, the setting operation 402 may prevent an administrator from setting the maximum size below a threshold value. In another implementation, the setting operation 402 sets the maximum size at a designated proportion (e.g., $15/16$) of the available memory capacity.

A second setting operation 404 sets an upper limit on a size of a deduplication table. For example, a user may designate an amount of DRAM to allocate to the deduplication table. The upper limit ensures there is enough memory to store the complete deduplication table, while preventing the size of the deduplication table to grow beyond the maximum size of the critical state. In one implementation, the second setting operation 404 prevents a user from allocating less memory than a current size of the deduplication table and from allocating more memory than the maximum size of the critical state set in the setting operation 402.

A receiving operation 406 receives a write command for a chunk of data, which may be a file, a block, or a byte. An assigning operation 408 assigns a priority level to the chunk of data. In one implementation, the priority level may be critical, high, or normal. The priority state dictates how long the data is cached, and consequently, the order in which the data is evicted. Data assigned a priority state of critical will remain resident in cache memory unless heavy memory pressure causes the system to reclaim memory and all data assigned a priority state of high or normal has been evicted. High priority data is cached longer than normal priority data, with normal priority data being evicted first.

An operation 410 determines whether the critical maximum cache size is reached or exceeded. If the critical maximum has not been reached or exceeded, a writing operation 412 writes the data according to the priority assigned in the assigning operation 408. For example, the writing operation 412 may write data assigned a critical priority to the critical state; the writing operation 412 may write data assigned a high priority to a most frequently used cache directory; and the writing operation 412 may write data assigned a normal priority to a most recently used cache directory.

On the other hand, if the critical maximum has been reached or exceeded, such that critical data is being evicted, system performance may be significantly impacted. In such cases, a generating operation 414 provides feedback to warn the user about the potential for reduced system performance and suggests options for remedying the problem based on user preferences. In some implementations, the generating operation 414 submits a report or issues an alert to the user. The generating operation 414 may suggest, for example, adding more memory, removing data, such as a storage pool (e.g., zpool), or restoring a server that failed over into another storage pool causing the memory, and in some cases the critical state, to be temporarily oversubscribed.

Figure 5:
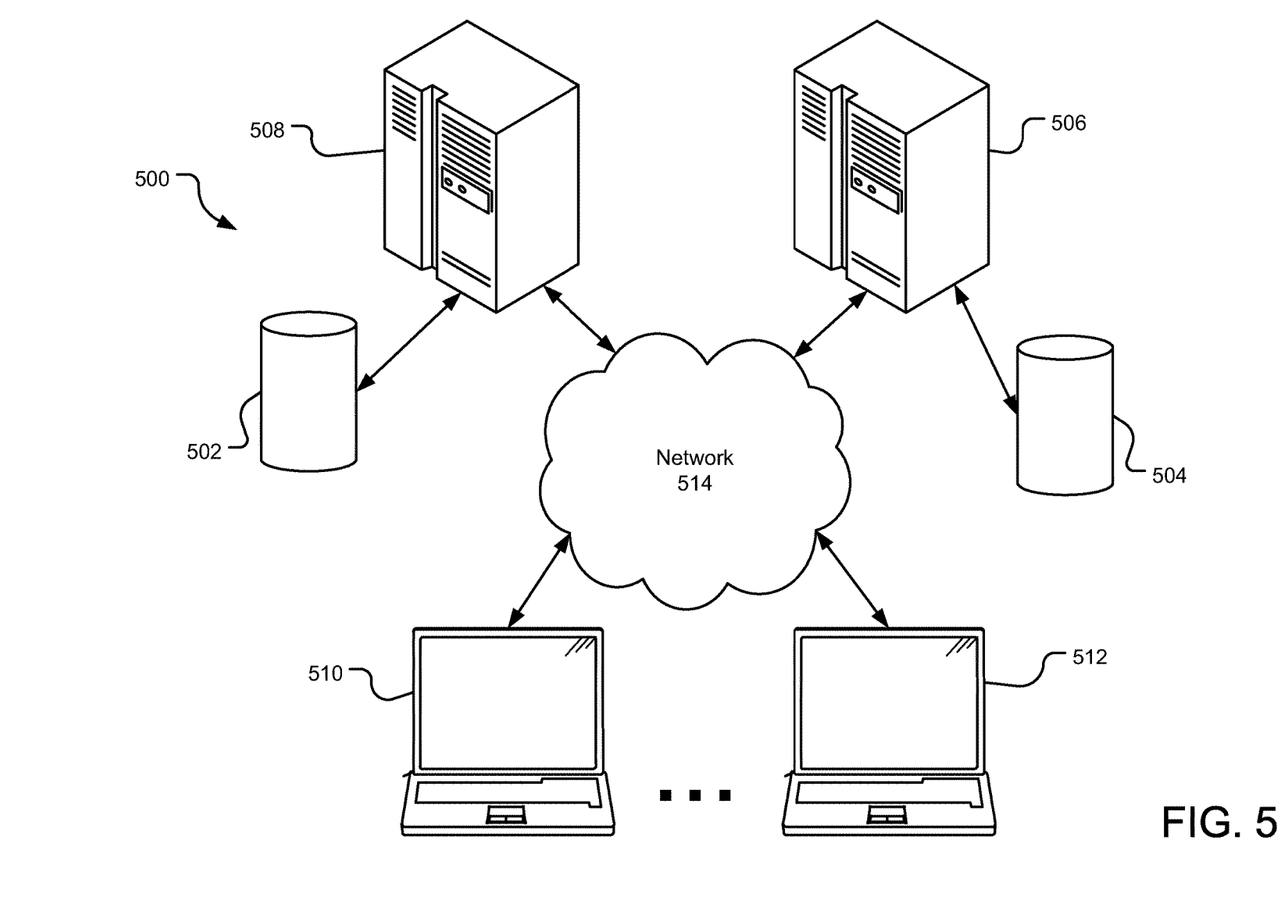
FIG. 5 is an example network environment that may implement various systems and methods of the presently disclosed technology.
Figure 6:
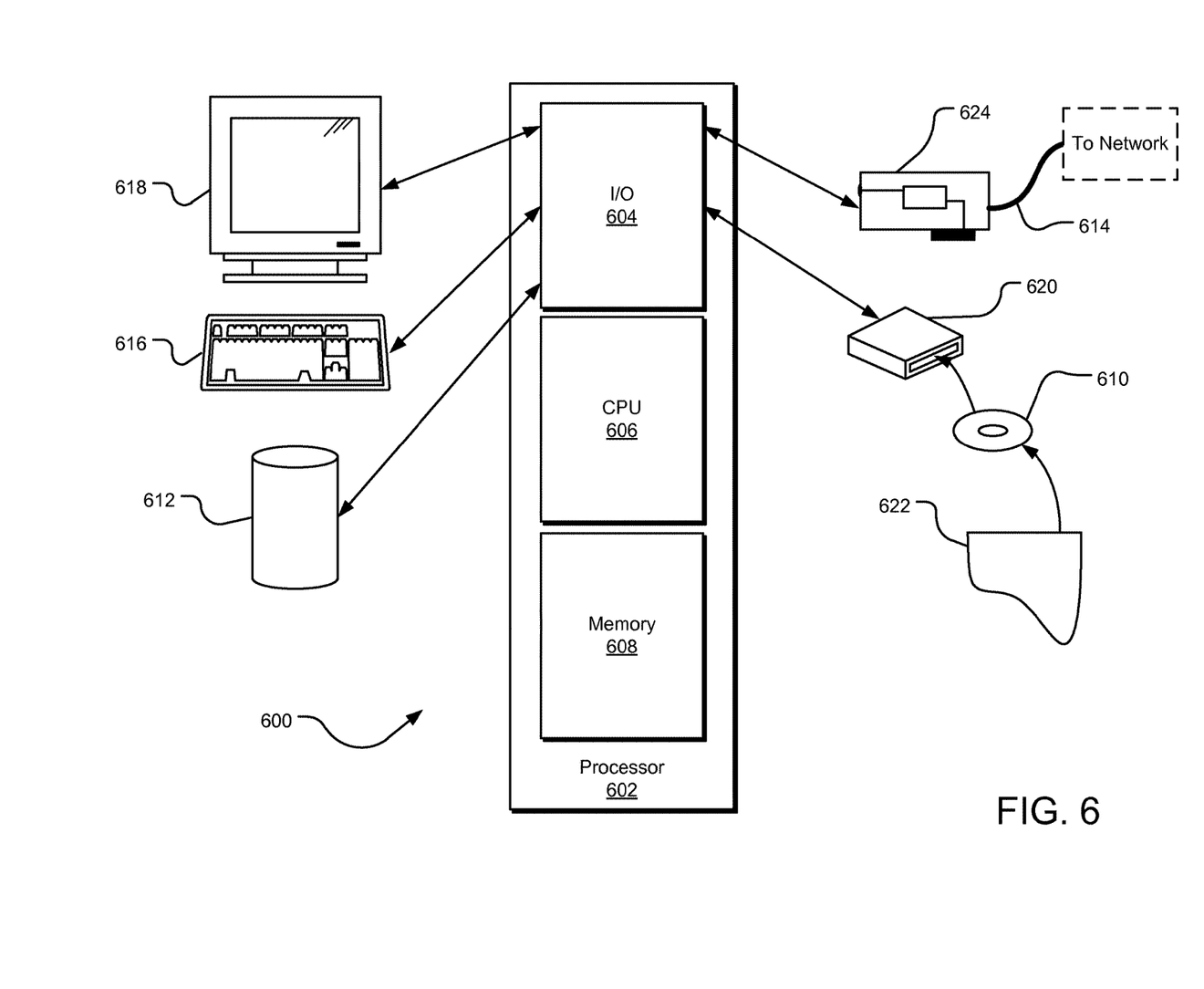
FIG. 6 is an example computing system that may implement various systems and methods of the presently disclosed technology.

FIGS. 5 and 6 show an example network environment 500 and an example computing system 600, respectively, that may implement various systems and methods of the presently disclosed technology. Referring to FIG. 5, disks 502 and 504 are connected to one or more storage appliances 506, 508, which may be configured according to the systems and methods described herein, for example, with respect to the file system 100 of FIG. 1. One or more clients 510, 512 may have a need for data that is stored on one of the storage appliances 506, 508. The clients 510, 512 may access data from the storage appliances 506, 508 using a network 514.

Referring to FIG. 6, a general purpose computer system 600 is capable of executing a computer program product to execute a computer process. Data and program files may be input to the computer system 600, which reads the files and executes the programs therein. Some of the elements of the general purpose computer system 600 are shown in FIG. 6, wherein a processor 602 is shown having an input/output (I/O) section 604, a Central Processing Unit (CPU) 606, and memory 608.

There may be one or more processors 602, such that the processor 602 of the computer system 600 comprises the CPU 606 or a plurality of processing units, commonly referred to as a parallel processing environment. The computer system 600 may be a conventional computer, a distributed computer, or any other type of computer, such as one or more external computers made available via a network architecture, for example as described with respect to FIG. 5. The presently described technology is optionally implemented in software devices loaded in the memory 608, stored on a configured DVD/CD-ROM 610 or a storage unit 612, and/or communicated via a network link 614, thereby transforming the computer system 600 in FIG. 6 to a special purpose machine for implementing the operations described herein.

The I/O section 604 is connected to one or more user-interface devices (e.g., a keyboard 616 and a display unit 618), the storage unit 612, and a disk drive 620. In one implementation, the disk drive 620 is a DVD/CD-ROM drive unit capable of reading the DVD/CD-ROM 610, which typically contains programs and data 622. In another implementation, the disk drive 620 is a solid state drive unit.

Computer program products containing mechanisms to effectuate the systems and methods in accordance with the presently described technology may reside in the memory 604, on the storage unit 612, on the DVD/CD-ROM 610 of the computer system 600, or on external storage devices made available via a network architecture with such computer program products, including one or more database management products, web server products, application server products, and/or other additional software components. Alternatively, the disk drive 620 may be replaced or supplemented by a floppy drive unit, a tape drive unit, or other storage medium drive unit. The network adapter 624 is capable of connecting the computer system 600 to a network via the network link 614, through which the computer system 600 can receive instructions and data embodied in a carrier wave. An example of such systems is personal computers. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are examples of communications devices for and other means of establishing a communications link between the computers may be used.

In an example implementation, deduplication table management and/or data priority assignment software and other modules and services may be embodied by instructions stored on such storage systems and executed by the processor 602. Some or all of the operations described herein may be performed by the processor 602. Further, local computing systems, remote data sources and/or services, and other associated logic represent firmware, hardware, and/or software configured to control data access. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 602 and a user may interact with a Graphical User Interface (GUI) using one or more user-interface devices (e.g., the keyboard 616, the display unit 618, and the user devices 604) with some of the data in use directly coming from online sources and data stores.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
preventing an amount of memory of a level one cache allocated to a deduplication table from being less than a current size of the deduplication table stored in the level one cache;
establishing an upper limit to the amount of a level one cache allocated to a deduplication table using at least one processor, the deduplication table having one or more secure hash entries, each secure hash entry associating a secure hash value with unique data, the upper limit preventing the deduplication table from growing unbounded and maintaining an entirety of the deduplication table in only the level one cache; and
preventing, using the at least one processor, a new secure hash entry corresponding to new unique data from being added to the deduplication table where adding the new secure hash entry will cause the deduplication table to exceed the upper limit, the new unique data having a secure hash value that is different from the secure hash values in the one or more secure hash entries in the deduplication table.

2. The method of claim 1, wherein the level one cache allocated to the deduplication table is direct random access memory based cache.

3. The method of claim 1, wherein the upper limit is less than a maximum capacity of the level one cache.

4. The method of claim 1 further comprising:
writing the new unique data to a storage location.

5. The method of claim 1 further comprising:
removing at least one of the one or more secure hash entries in the deduplication table to create space for at least one new secure hash entry.

6. The method of claim 5, wherein the at least one secure hash entry is removed based on user input.

7. The method of claim 5, wherein the at least one secure hash entry is removed based on a reference count entry associated with the at least one secure hash entry, the reference count entry indicating a number of write requests for duplicate copies of data by incrementing a reference count each time a write request is received for data having a duplicate secure hash value that matches one of the secure hash entries in the deduplication table.

8. The method of claim 7, wherein the at least one secure hash entry is removed when the reference count entry is zero for a time period.

9. The method of claim 8, wherein the time period is set by a user.

10. The method of claim 1, wherein each secure hash entry is a checksum entry and the secure hash values are checksum values.

11. One or more non-transitory tangible computer-readable storage media storing computer-executable instructions for performing a computer process on a computing system, the computer process comprising:
storing an entirety of a deduplication table in a level one cache being only one level of cache memory, the deduplication table having one or more secure hash entries, each secure hash entry associating a secure hash value with unique data;
preventing the deduplication table from growing unbounded by establishing an upper limit to an amount of the level one cache allocated to a deduplication table, the upper limit keeping the entirety of the deduplication table resident in the level one cache;
preventing the amount of the level one cache allocated to the deduplication table from being less than a current size of the deduplication table and larger than a maximum capacity of the level one cache; and preventing a new secure hash entry corresponding to new unique data from being added to the deduplication table where adding the new secure hash entry will cause the deduplication table to exceed the upper limit, the new unique data having a secure hash value that is different from the secure hash values in the one or more secure hash entries in the deduplication table.

12. The one or more non-transitory tangible computer-readable storage media of claim 11, the computer process further comprising:

removing at least one of the one or more secure hash entries in the deduplication table to create space for at least one new secure hash entry.

13. The one or more non-transitory tangible computer-readable storage media of claim 12, wherein the at least one secure hash entry is removed based on user input.

14. A system comprising:

a level one cache having one level of direct random access memory based cache storing an entirety of a deduplication table having one or more secure hash entries, each secure hash entry associating a secure hash value with unique data; and a deduplication module executable by at least one processor, the deduplication module allocating an amount of memory in the level one cache to the deduplication table, the deduplication module preventing the amount of memory in the level one cache from being less than a current size of the deduplication table, the deduplication module establishing an upper limit to an amount of the one level of direct random access memory based cache of the level one cache allocated to a the deduplication table to retain the entirety of the deduplication table in the one level of direct random access memory based cache of the level one cache by precluding the deduplication table from growing unbounded, the deduplication module preventing a new secure hash entry corresponding to new unique data from being added to the deduplication table where adding the new secure hash entry will cause the deduplication table to exceed the upper limit, the new unique data having a secure hash value that is different from the secure hash values in the one or more secure hash entries in the deduplication table.

15. The system of claim 14, wherein the upper limit is less than a maximum capacity of the one level of direct random access memory based cache of the level one cache.

16. The system of claim 14, wherein the deduplication module is further configured to remove at least one of the one or more secure hash entries in the deduplication table to create space for at least one new secure hash entry.

17. The system of claim 16, wherein the deduplication module removes the at least one secure hash entry from the deduplication table based on user input.

18. The system of claim 16, wherein the deduplication module removes the at least one secure hash entry from the deduplication table based on a reference count entry associated with the at least one secure hash entry, the reference count entry indicating a number of write requests for duplicate copies of data by incrementing a reference count each time a write request is received for data having a duplicate secure hash value that matches one of the secure hash entries in the deduplication table.

* * * * *